(12) United States Patent
Rost et al.

(10) Patent No.: US 9,149,760 B2
(45) Date of Patent: Oct. 6, 2015

(54) METHOD AND APPARATUS FOR SEPARATION OF CARBON DIOXIDE FROM AN OFF-GAS FROM A FOSSIL-FUELED POWER STATION

(75) Inventors: Mike Rost, Erlangen (DE); Ruediger Schneider, Eppstein (DE); Henning Schramm, Frankfurt am Main (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 240 days.

(21) Appl. No.: 13/637,670

(22) PCT Filed: Mar. 3, 2011

(86) PCT No.: PCT/EP2011/053175
§ 371 (c)(1),
(2), (4) Date: Sep. 27, 2012

(87) PCT Pub. No.: WO2011/120754
PCT Pub. Date: Oct. 6, 2011

(65) Prior Publication Data
US 2013/0019751 A1    Jan. 24, 2013

(30) Foreign Application Priority Data
Mar. 31, 2010 (DE) .......... 10 2010 013 729

(51) Int. Cl.
*B01D 53/14* (2006.01)
*F23J 15/04* (2006.01)
*F23J 15/00* (2006.01)

(52) U.S. Cl.
CPC ........ *B01D 53/1425* (2013.01); *B01D 53/1475* (2013.01); *F23J 15/006* (2013.01); *B01D 2257/504* (2013.01); *F23J 2215/50* (2013.01);
(Continued)

(58) Field of Classification Search
CPC ................ B01D 2257/504; B01D 53/1425; B01D 53/1475; F23J 15/006; F23J 2215/50; F23J 2219/60; Y02C 10/04; Y02C 10/06; Y02E 20/16
See application file for complete search history.

(56) References Cited

U.S. PATENT DOCUMENTS

| 4,364,915 A | 12/1982 | Proctor |
| 2007/0163443 A1* | 7/2007 | Moriyama et al. ............. 96/234 |

(Continued)

FOREIGN PATENT DOCUMENTS

| AU | 2011234814 B2 | 5/2014 |
| CN | 101213010 A | 7/2008 |

(Continued)

*Primary Examiner* — Duane Smith
*Assistant Examiner* — Cabrena Holecek

(57) ABSTRACT

A separation apparatus for carbon dioxide is provided which includes an absorption unit for absorbing flue gas from a fossil-fueled power station, a desorption unit and a heat exchanger which on the primary feed side is connected via an inlet-side feedback line to the desorption unit, and on the discharge side is connected via an outlet-side feedback line to the absorption unit. On the secondary feed side, the heat exchanger is connected via an inlet-side feed line to the absorption unit, and on the discharge side is connected via an outlet-side feed line to the desorption unit. A first bypass line connects the inlet-side feedback line to the outlet-side feed line so that a mostly closed first circuit with the desorption unit is formed, and a second bypass line connects the inlet-side feed line to the outlet-side feedback line so a mostly closed second circuit with the absorption unit is formed.

5 Claims, 2 Drawing Sheets

(52) U.S. Cl.
CPC .............. *F23J 2219/60* (2013.01); *Y02C 10/04* (2013.01); *Y02C 10/06* (2013.01); *Y02E 20/16* (2013.01)

(56) References Cited

U.S. PATENT DOCUMENTS

| | | | |
|---|---|---|---|
| 2009/0263302 A1 | 10/2009 | Hu | |
| 2009/0277330 A1* | 11/2009 | Yoshiyama et al. | 95/186 |
| 2009/0293722 A1* | 12/2009 | Svendsen et al. | 95/136 |

FOREIGN PATENT DOCUMENTS

| | | |
|---|---|---|
| DE | 3542537 A1 | 6/1986 |
| EP | 2105189 A1 | 9/2009 |
| JP | 2006035059 A | 2/2006 |
| JP | 2010201379 A | 9/2010 |
| RU | 87367 U1 | 10/2009 |
| SU | 1161168 A1 | 6/1985 |
| WO | WO 2007001190 A1 | 1/2007 |

\* cited by examiner

METHOD AND APPARATUS FOR SEPARATION OF CARBON DIOXIDE FROM AN OFF-GAS FROM A FOSSIL-FUELED POWER STATION

CROSS REFERENCE TO RELATED APPLICATIONS

This application is the US National Stage of International Application No. PCT/EP2011/053175, filed Mar. 3, 2011 and claims the benefit thereof. The International Application claims the benefits of German application No. 10 2010 013 729.4 DE filed Mar. 31, 2010. All of the applications are incorporated by reference herein in their entirety.

FIELD OF INVENTION

The invention refers to a separation apparatus for carbon dioxide for operation in a fossil-fueled power station, to a fossil-fueled power station with a separation apparatus for carbon dioxide, to a carbon dioxide separation process for a fossil-fueled station process, and to the use of a carbon dioxide separation process in a fossil-fueled power station.

BACKGROUND OF INVENTION

In fossil-fueled power stations for generating electric energy, a carbon dioxide-containing off-gas is produced as a result of combusting a fossil fuel. This carbon dioxide-containing off-gas as a rule is released into the atmosphere. In order to achieve a reduction of the carbon dioxide emission in fossil-fueled power stations, carbon dioxide can be separated from the off-gas.

For separating carbon dioxide from a gas mixture, different methods are generally known. In particular, for separating carbon dioxide from an off-gas after a combustion process, the method of absorption-desorption is in common use. On a commercial scale, the described separation of carbon dioxide with the absorption-desorption method is carried out with a selective scrubbing agent for carbon dioxide. In this case, the off-gas in an absorption column is brought into contact with the selective solvent, wherein carbon dioxide is bound in the solvent. The off-gas which is largely cleaned of carbon dioxide is released from the absorption column for a further process or for discharging. The solvent which is laden with carbon dioxide is directed into a desorption column for separation of the carbon dioxide and regeneration of the solvent. The separation in the desorption column can be carried out thermally. In this case, the laden solvent is heated, wherein a gas-vapor mixture consisting of gaseous carbon dioxide and evaporated solvent is produced - this being the so-called exhaust vapor. The evaporated solvent is then separated from carbon dioxide. The separated carbon dioxide can now be compressed and cooled in a plurality of stages. In liquid or frozen state, carbon dioxide can then be fed to a storage facility or to a further application. The regenerated solvent is directed once more to the absorption column where carbon dioxide can again be absorbed from the carbon dioxide-containing off-gas.

A great disadvantage of the absorption-desorption method above all is that for desorption a great deal of energy generally has to be expended. This energy as a rule is extracted in the form of heating steam from the power station process, which significantly impairs the overall efficiency of the power station. In order to reduce the necessary energy expenditure for the desorption, the prior art already discloses a series of improvement proposals, wherein the energy expenditure is to be optimized particularly by means of an improved integration of the absorption-desorption process into the power station process.

A big problem, furthermore, is that the described absorption-desorption process above all is very slow-acting on account of the necessary constructional size of the absorption-desorption column. A largely comprehensive separation of carbon dioxide from an off-gas of the power station can only effectively begin, moreover, when heating steam can adequately be made available by means of the power station and the desorption column is adequately heated through. Up to this point in time, it was previously possible for large amounts of carbon dioxide-laden off-gas to be released into the atmosphere in an uncleaned state.

A power station, for example a combined cycle power station, but also increasingly steam power stations, are taken off the grid with increasing frequency, for example each night, or each weekend. With the power station shut down, there is no longer the development of carbon dioxide-containing flue gas. However, steam or heating steam is no longer available either. If the carbon dioxide separation apparatus is shut down together with the power station without additional measures, a series of problems can occur. Thus, the carbon dioxide-laden solvent which remains in the absorption-desorption apparatus cools down, as a result of which solubility limits are fallen short of, and precipitation and sedimentation of products can occur. As a result of settling particles or suspended particles, which are contained within the solvent, there is an increased risk of blocking.

Shutting down a carbon dioxide separation apparatus which is integrated into a power station also proves to be difficult. During a planned downtime of the absorption-desorption plant, the solvent which is contained within the entire solvent circuit has to be largely completely desorbed for avoiding the risk of blocking. For this, the absorption column is separated from the off-gas stream and the desorption column is heated in addition. As a result, further carbon dioxide is desorbed by means of the desorption column and further carbon dioxide is no longer absorbed in the absorption column After a comparatively long time, the solvent is regenerated to the point where the station can be shut down. Up to that point, the carbon dioxide separation apparatus has to be supplied with sufficiently high-quality heating steam. If the power station is to be started up again, the solvent has to be heated again. Until reaching the operating temperature, a comparatively long time elapses in which no carbon dioxide can be separated or an economical degree of separation is not achieved.

The largely complete desorption of the solvent for a short downtime, however, on the one hand is uneconomical, and, moreover, is associated with a long restarting time of the desorption column Therefore, the carbon dioxide separation apparatus is preferably kept in standby mode in the case of a short downtime. In standby mode, however, heating of the solvent is furthermore necessary in order to ensure a fast restart on the one hand and on the other hand to prevent a possible crystallization or precipitation of the solvent. Moreover, it is also necessary in standby mode that the solvent is additionally circulated, that is to say is pumped round the circuit. As a result of the circulation, the occurrence of products of humidification or evaporation as a result of retention of the solvent in any fillets or dead spaces, which again lead to crystallization, is prevented. A reduction of the flow rate in standby mode is certainly possible, but only providing the entire solvent circuit is adequately exposed to circulation at each point.

SUMMARY OF INVENTION

It is therefore an object of the invention to disclose a separation apparatus for carbon dioxide for operation in a fossil-fueled power station, and a fossil-fueled power station with a separation apparatus for carbon dioxide which on the one hand enables an energetically economical standby mode and on the other hand ensures a fast return to service of the carbon dioxide separation apparatus, wherein the required energy demand in standby mode is largely reduced.

Furthermore, it is an object of the invention to disclose a carbon dioxide separation process for a fossil-fueled power station process, and the use of a carbon dioxide separation process in a fossil-fueled power station, which on the one hand enables an energetically economical standby-mode state, and on the other hand ensures a fast return to service of the carbon dioxide separation process, wherein the required energy demand in the standby-mode state is largely reduced.

The object of the invention which is directed towards an apparatus is achieved by means of the features of the claims.

The separation apparatus according to the invention for carbon dioxide essentially comprises an absorption unit for absorbing flue gas from a fossil-fueled power station, a desorption unit and a heat exchanger. The heat exchanger has a primary side by means of which heat can be absorbed, and a secondary side by means of which the absorbed heat can be emitted again. The heat exchanger is connected by its primary side into a feedback line which connects the desorption unit to the absorption unit. On the primary feed side, the heat exchanger in this case is connected via the inlet-side feedback line to the desorption unit, and on the primary discharge side is connected via the outlet-side feedback line to the absorption unit. By its secondary side, the heat exchanger is connected into a feed line which connects the absorption unit to the desorption unit. On the secondary feed side, the heat exchanger in this case is connected via an inlet-side feed line to the absorption unit and on the discharge side is connected via an outlet-side feed line to the desorption unit. According to the invention, provision is now made for a first bypass line which connects the inlet-side feedback line to the outlet-side feed line so that a substantially closed first circuit with the desorption unit is formed, and provision is made for a second bypass line which connects the inlet-side feed line to the outlet-side feedback line so that a substantially closed second circuit with the absorption unit is formed.

It is the essence of the invention to divide the actual solvent circuit, which is essentially formed by means of the absorption unit, the desorption unit, the heat exchanger, the feed line and the feedback line, into two separate solvent circuits, that is to say into a first solvent circuit with the desorption unit and a second solvent circuit with the absorption unit. The division of the actual solvent circuit into a first solvent circuit and a second solvent circuit is achieved by means of the first bypass line and the second bypass line. In this case, the first bypass line and the second bypass line are arranged in such a way that these bridge the heat exchanger.

In the case of the heat exchanger, it is a crossflow heat exchanger which is customarily used in absorption-desorption apparatuses of this type. In the heat exchanger, a hot, regenerated solvent is directed in counterflow to a warm, laden solvent, wherein heat from the hot regenerated solvent is emitted to the warm, laden solvent. As a result of the extensive bridging of the heat exchanger by means of the first bypass line and the second bypass line, the effect is achieved on the one hand of a first solvent circuit and a second solvent circuit being created, wherein the two circuits are largely closed circuits, and an exchange of heat between the two circuits being largely reduced.

This enables a particularly advantageous operation of the separation apparatus in the standby-mode state. To be specific, this especially enables the first solvent circuit and the second solvent circuit to be operated with different parameters. As a result, each solvent sub-circuit can be optimally optimized for its minimum standby requirements without the respective other solvent circuit influencing this. This enables an optimized matching of the respective solvent sub-circuit to the standby-mode state so that a fast return to service of the carbon dioxide separation apparatus is ensured, and at the same time a reduction of the necessary energy demand in the standby-mode state since less energy is required for heating the separation apparatus.

Therefore, for example the desorption unit can be additionally heated in order to quickly be at an optimum desorption temperature when returning to the normal operating state without the absorption unit also having to be heated to the same extent. At the same time, as a result of the decoupling or separating of absorption unit and desorption unit, the absorption unit can be operated at a lower temperature in the standby-mode state.

Provision is expediently made, moreover, for corresponding shut-off valves and control valves in order to be able to control and adjust the solvent flow. Therefore, in the feedback line, downstream of the branch of the first bypass line, provision is made for a first valve by means of which the solvent flow can be reduced or shut off. As a result, the effect is achieved of at least a partial flow of the solvent being directed through the first bypass line. Similarly to this, in the feed line, downstream of the branch of the second bypass, provision is made for a second valve by means of which the solvent flow can be reduced or shut off. As a result, the effect is achieved of at least a partial flow of the solvent being directed through the second bypass line.

For example, it is consequently possible to keep the first solvent circuit with the desorption unit at a higher temperature than the second solvent circuit. Also, as a result of two solvent circuits which are separated in a pressure-tight manner, the first solvent circuit could be kept at a different pressure to the second solvent circuit.

Alternatively or additionally to this, the possibility exists of operating the two solvent circuits with different flow rates of the solvent which is to be delivered. The respective separate solvent circuit is subjected to circulation for this, corresponding to the minimum delivery quantities. As a result, different flow rates for circulation of the solvent in the respective solvent circuits can be established and therefore optimized for the respective solvent circuit. This enables saving of electric energy and therefore reduces the necessary electric energy for the standby-mode.

In a further development of the separation apparatus, a first auxiliary heat exchanger is connected into the first bypass line. This first auxiliary heat exchanger is particularly advantageous when in standby mode provision is made for a further heating of the desorption unit, but, for example on account of shutting down the power station, no heating steam is made available for direct operation of the desorption unit. In this case, heat energy can be introduced into the first solvent circuit, and therefore into the desorption unit, by means of the auxiliary heat exchanger. The first auxiliary heat exchanger, however, can also be arranged at any other optional point of the circuit with the desorption unit.

Additionally or alternatively, in a further embodiment of the separation apparatus a second auxiliary heat exchanger is connected into the second bypass line. The second auxiliary heat exchanger can also be operated without the first auxiliary heat exchanger. The purpose of the second auxiliary heat exchanger in this case is similar to the purpose of the first heat exchanger and in standby mode enables heating of the absorption unit. Also, the second auxiliary heat exchanger can be arranged at any other optional point of the circuit with the absorption unit.

In a particular development of the separation apparatus, the first auxiliary heat exchanger of the first bypass line is connected to the second auxiliary heat exchanger of the second bypass line so that heat can be transferred from the first auxiliary heat exchanger to the second auxiliary heat exchanger. This enables a standby mode of the separation apparatus in which on the one hand two separate solvent circuits are established, and on the other hand the desorption unit and the absorption unit are additionally heated. In this case, as in the normal operating state, heat in the form of heating steam is introduced into the desorption unit, and therefore into the first solvent circuit, via a sump boiler. For heating the absorption unit, heat from the first solvent circuit is now introduced by means of the first auxiliary heat exchanger, via a line, into the second auxiliary heat exchanger, and subsequently into the second solvent circuit and therefore into the absorption unit.

In a further advantageous development of the separation apparatus, a first valve is connected into the first bypass line, and a second valve is connected into the second bypass line. In the case of the valves, they are control valves or shut-off valves by means of which it is possible to adjust the flow rate of solvent of the respective bypass. In standby mode, the first valve and the second valve are at least partially or fully opened, and therefore the first bypass and the second bypass are at least partially open. In the normal operating state, the first valve and the second valve are largely closed so that the first bypass and the second bypass are largely closed off.

The fossil-fueled power station in which the separation apparatus for carbon dioxide is integrated, or to which it is connected downstream, is preferably a steam power plant. The steam power plant in this case comprises a fossil-fueled boiler, a steam turbine which is operated by the steam of the boiler, a generator which is driven by the steam turbine via a shaft, and the separation apparatus for carbon dioxide which is connected downstream to the boiler on the flue gas side. Alternatively, the fossil-fueled power station can also be a CCPP (combined cycle power plant or gas and steam plant). The CCPP in this case comprises a fossil-fueled gas turbine, a heat recovery steam generator which is connected into the waste heat duct of the gas turbine, a steam turbine which is operated by the steam of the heat recovery steam generator, at least one generator which is driven by the gas turbine and the steam turbine via a shaft, and the separation apparatus for carbon dioxide which is connected downstream to the gas turbine on the exhaust gas side.

The object of the invention which is directed towards the method is achieved by means of the features of the claims.

The carbon dioxide separation process according to the invention for a fossil-fueled power station process essentially comprises an absorption process and a desorption process. In the carbon dioxide separation process, a distinction is made between a normal operating state and a special operating state which deviates from the normal operating state. In the special operating state, a first bypass is opened so that regenerated solvent from the desorption process is at least partially fed back again into the desorption process. Furthermore, a second bypass is opened so that a laden solvent from the absorption process is at least partially fed back into the absorption process.

Moreover, it is still possible that a portion of the heat from a regenerated solvent of the desorption process is transferred to a laden solvent of the absorption process.

In this case, it is essential that the original solvent circuit, which in the normal operating state is formed especially by the connection between absorption process and desorption process, is divided into two largely separate solvent circuits in the special operating state. This division is achieved by means of the first bypass and the second bypass. By means of the first bypass, a largely closed first solvent circuit with the desorption process is formed, and by means of the second bypass a largely closed second solvent circuit with the absorption process is formed. As a result of the two solvent circuits, which are largely separated from each other, it is possible that an exchange of heat between the two solvent circuits is largely reduced. As a result of this development, the first solvent circuit and the second solvent circuit can be advantageously operated with different parameters. Thus, for example the desorption unit can be additionally heated in order to quickly be at an optimum desorption temperature when returning to the normal operating state without the absorption unit also having to be heated to the same extent. At the same time, as a result of the decoupling or the separation of absorption process and desorption process, the absorption unit can be operated at a lower temperature in the standby-mode state. Also, as a result of two solvent circuits which are separated in a pressure-tight manner, the first solvent circuit could be kept at a different pressure to the second solvent circuit. As a result of this measure, it is ensured that the station can quickly go into the standby-mode state, can be quickly restarted, and, moreover, requires only little energy in the standby-mode state since only the actual heat losses of the solvent are compensated.

The location of the respective solvent is especially to be explained by the terms "laden solvent" and "regenerated solvent". Regenerated solvent is located in the region of the desorption process since solvent is regenerated in the desorption process, and laden solvent is located in the region of the absorption process since carbon dioxide is absorbed in the absorption process. In the special operating state, however, a state can be established in which the laden solvent has the same loading of carbon dioxide as the regenerated solvent.

The basic idea of dividing the original solvent circuit into two solvent circuits which are separated from each other enables an operation in which only a portion of the solvent is used in the two solvent circuits which are separated from each other. The other portion is used within the original solvent circuit, as in the normal operating state. This, for example, can especially be advantageous if in the standby-mode state the energy yield into the absorption process is carried out within the desorption process, and the absorption process is also to be heated to a lesser degree. In this case, a portion of the solvent is directed from the first solvent circuit into the second solvent circuit.

An embodiment of the carbon dioxide separation process, in which between 80% and 98% of the solvent from the desorption process is redirected by means of the first bypass back into the desorption process, and therefore forms the first solvent circuit, and between 2% and 20% is fed to the absorption process, and therefore, as the original solvent circuit, is used in the normal operating state, has proved to be advantageous. As a result, heat from the desorption process is introduced into the absorption process. Consequently, in turn between 80% and 98% of the solvent from the absorption process is again fed back by means of the second bypass into the absorption process, and between 2% and 20% is fed to the desorption process. The percentage in this case refers to the circulated volume of solvent. Feeding into the absorption process is carried out via an upstream heat exchanger process.

A ratio of 10% to 90% has proved to be especially advantageous. In this case, 10% of the solvent is directed from the desorption process into the absorption process, and 90% is directed back again via the bypass into the desorption process. As a result of this ratio, for example at a temperature in the desorption process of about 100° C., a temperature in the absorption process of about 40° C. can be established. As a result of the lower temperature in the absorption process, heating energy in the special operating state is saved.

In an alternative embodiment of the carbon dioxide separation process, the regenerated solvent from the desorption process is fed completely via the first bypass into the desorption process, and the laden solvent from the absorption process is fed back again completely via the second bypass into the absorption process. That is to say, no division of the first solvent circuit and of the second solvent circuit into partial flows is carried out. However, it is provided that the regenerated solvent from the first solvent circuit exchanges heat with the laden solvent from the second solvent circuit so that the laden solvent is heated. Since the two solvent circuits are separated from each other, in the special operating state the desorption process can subsequently be operated at a different pressure to the absorption process, as a result of which an optimized mode of operation of the respective process can be established.

In the special operating state of the carbon dioxide separating process, an average temperature of between 30° C. and 70° C. is advantageously established in the absorber of the absorption process, and an average temperature of between 80° C. and 120° C. is advantageously established in the desorber of the desorption process. In this case, a temperature of about 40° C. in the absorber and a temperature of about 100° C. in the desorber have proved to be especially advantageous.

An amino-acid salt solution is expediently used as the solvent in the carbon dioxide separation process.

In a development of the carbon dioxide separation process, the flow rate of the laden solvent in the absorption process and/or of the regenerated solvent in the desorption process is furthermore reduced in the special operating state compared with the normal operating state. The flow rate defines the amount of solvent which is circulated in the process. Since in the special operating state no absorption, or only limited absorption, of carbon dioxide takes place, the flow rate can be reduced. As a result of the separation of the solvent circuits, it is possible to optimize the flow rate of the respective solvent to the respective solvent circuit without the respective other solvent circuit being greatly influenced. As a result, energy for the pumps which are used is saved.

As a result of the interrupted or limited absorption of carbon dioxide during the special operating state, it is expedient compared with the normal operating state if no cooling of the solvent which is introduced into the absorption process is carried out. In the normal operating state, cooling is carried out by means of a lean solvent cooler. As a result of cooling the solvent before entry into the absorption process, a higher loading of the solvent with carbon dioxide can consequently be achieved in the absorption process. Since, however, less carbon dioxide, or no carbon dioxide at all, has to be absorbed in the special operating state, cooling can be dispensed with, as a result of which energy is saved.

In the case of the special operating state, it is a standby-mode state. The special operating state is preferably operated when the fossil-fueled power station process is completely or partially shut down. The special operating state begins when only a reduced carbon dioxide-containing exhaust gas, or no carbon dioxide-containing exhaust gas at all, reaches the absorption process. In this connection, the flue gas cooler can be shut down.

The carbon dioxide separation process is preferably used in a fossil-fueled power station.

BRIEF DESCRIPTION OF THE DRAWINGS

Exemplary embodiments of the invention are subsequently explained in more detail with reference to the attached schematic drawings. In the drawings.

DETAILED DESCRIPTION OF INVENTION

Figure 1:
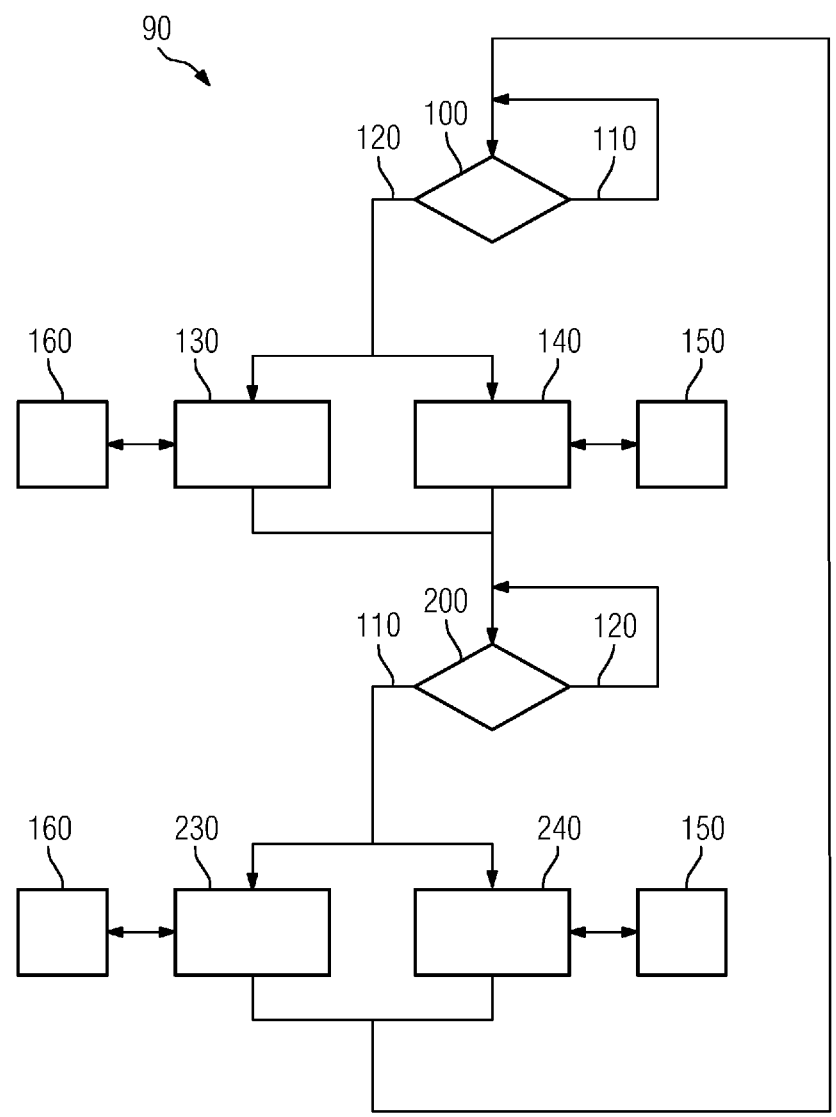
FIG. 1 shows an exemplary embodiment of a carbon dioxide separation process

In FIG. 1, a carbon dioxide separation process 90 is shown. The process begins with the decision step 100. By the decision step 100, it is established whether the carbon dioxide separation process 90 is to be changed from the normal operating state 110 into the special operating state 120. If the special operating state 120 is established, the following processes are carried out:

Opening a first bypass 130
Opening a second bypass 140

The sequence of the processes which are to be carried out can vary. By opening the first bypass 130, regenerated solvent from the desorption process 160 is at least partially fed back again into the desorption process 160. By opening the second bypass 140, a laden solvent from the absorption process 150 is at least partially fed back into the absorption process 150. A further process step, in which from the regenerated solvent of the desorption process 160 heat is emitted to the laden solvent of the absorption process 150, is not shown. As a result, an at least partial heating of the absorption process 150 is achieved by means of the desorption process 160. The carbon dioxide separation process 90 is now in the special operating state 120.

Following the decision step 100 is a decision step 200 with which it is established whether the carbon dioxide separation process 90 is to be changed back again from the special operating state 120 into the normal operating state 110. If the normal operating state 110 is established, the following processes are carried out:

Closing the first bypass 230
Closing the second bypass 240

The sequence of the processes which are to be carried out can vary. By closing the first bypass 130, the regenerated solvent from the desorption process 160 is directed again into the absorption process 150. By closing the second bypass 140, the laden solvent from the absorption process 150 is directed again into the desorption process 160. The carbon dioxide separation process 90 is now in the normal operating state 110 again.

Figure 2:
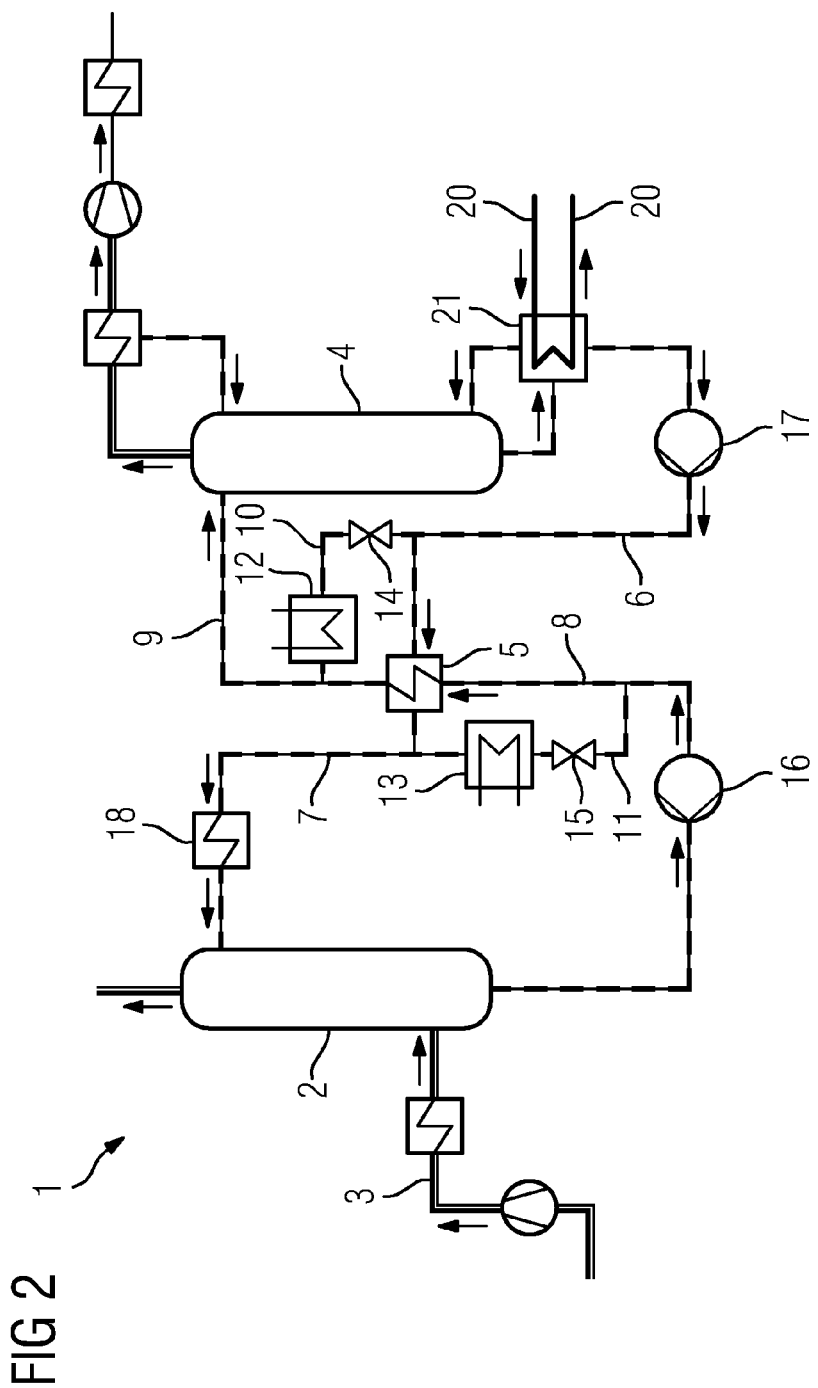
FIG. 2 shows an exemplary embodiment of a carbon dioxide separation apparatus

In FIG. 2, a separation apparatus 1 for carbon dioxide is shown. The power station, into which the separation apparatus 1 is integrated, is not shown. The separation apparatus 1 is connected to the power station via a flow duct for flue gas 3, and via a heating steam line 20. By means of the flow duct for flue gas 3, a carbon dioxide-containing flue gas is fed to the separation apparatus 1 in the normal operating state. Via the heating steam line 20, the separation apparatus is supplied with heating steam during operation. For this, the heating steam is introduced into a sump boiler 21. The introduction of the heating steam into for example a side heating device is not shown.

The separation apparatus 1 essentially comprises an absorption unit 2, a desorption unit 4, a heat exchanger 5, a first bypass line 10 and a second bypass line 11. The heat exchanger 5 has a primary side for absorbing heat and a secondary side for emitting heat. The heat exchanger on the primary feed side is connected via an inlet-side feedback line 6 to the desorption unit 4, and on the discharge side is connected via an outlet-side feedback line 7 to the absorption unit 2. On the secondary feed side, the heat exchanger 5 is connected via an inlet-side feed line 8 to the absorption unit 2, and on the discharge side is connected via an outlet-side feed line 9 to the desorption unit 4. As a result of this interconnecting arrangement, a circuit between absorption unit 2 and desorption unit 4, via the heat exchanger 5, for a solvent is formed.

Furthermore, provision is made for a first bypass line 10 into which a first valve 14 and a first auxiliary heat exchanger are connected. The first bypass line 10 connects the inlet-side feedback line 6 to the outlet-side feed line 9. By means of the first bypass line 10, an at least largely closed first circuit with the desorption unit is formed. Moreover, provision is made for a second bypass line 11, into which a second valve 15 and a second auxiliary heat exchanger 13 are connected. The second bypass line 11 connects the inlet-side feed line 8 to the outlet-side feedback line 7. By means of the second bypass line 11, an at least largely closed second circuit with the absorption unit is formed.

A connecting line, which connects the first auxiliary heat exchanger 12 to the second auxiliary heat exchanger 13, is not shown. By means of such a connecting line, heat can be transferred from the first auxiliary heat exchanger 12 to the second auxiliary heat exchanger 13.

A first pump 17 is connected into the inlet-side feedback line 6, and a second pump 16 is connected into the inlet-side feed line 8. How rates, at which solvent is circulated in the first circuit and in the second circuit, can be adjusted in each case by means of the first pump 17 and the second pump 16. Various additional fittings, such as additional valves or control devices which can be connected into the feed line or into the feedback line, are not shown.

A cooler 18 is connected into the outlet-side feedback line 7. The cooler 18 can be reduced in its output or switched off in the standby-mode state.

As a result of the two circuits which are largely separated from each other, it is possible that an exchange of heat between the two circuits is largely reduced. As a result of this measure, the first circuit and the second circuit can be advantageously operated with different parameters. This enables an optimized matching of the respective circuit to the standby-mode state on the one hand so that a fast return to service of the separation apparatus 1 is ensured, and at the same time enables a reduction of the necessary energy demand in the standby-mode state since less energy is required for heating the separation apparatus 1 and for circulating the solvent.

The invention claimed is:

1. A separation apparatus for carbon dioxide, comprising:
   an absorption unit for absorbing flue gas from a fossil-fueled power station;
   a desorption unit; and
   a heat exchanger,
   wherein the heat exchanger on a primary feed side is connected via an inlet-side feedback line to the desorption unit, and on a discharge side is connected via an outlet-side feedback line to the absorption unit, and on a secondary feed side is connected via an inlet-side feed line to the absorption unit, and on the discharge side is connected via an outlet-side feed line to the desorption unit,
   wherein a first bypass line connects the inlet-side feedback line to the outlet-side feed line so that a substantially closed first circuit with the desorption unit is formed, and
   wherein a second bypass line connects the inlet-side feed line to the outlet-side feedback line so that a substantially closed second circuit with the absorption unit is formed.

2. The separation apparatus as claimed in claim 1, wherein a first auxiliary heat exchanger is connected into the first bypass line.

3. The separation apparatus as claimed in claim 2, wherein a second auxiliary heat exchanger is connected into the second bypass line.

4. The separation apparatus as claimed in claim 3, wherein the first auxiliary heat exchanger of the first bypass line is connected to the second auxiliary heat exchanger of the second bypass line so that heat is transferred from the first auxiliary heat exchanger to the second auxiliary heat exchanger.

5. The separation apparatus as claimed claim 1,
   wherein a first valve is connected into the first bypass line, and
   wherein a second valve is connected into the second bypass line.

* * * * *